(12) United States Patent
Kurose et al.

(10) Patent No.: US 8,320,263 B2
(45) Date of Patent: Nov. 27, 2012

(54) MOBILE RADIO TERMINAL

(75) Inventors: Kengo Kurose, Hamura (JP); Shigeo Terabe, Kawasaki (JP); Yutaka Asanuma, Tokyo (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 1186 days.

(21) Appl. No.: 11/712,259

(22) Filed: Feb. 28, 2007

(65) Prior Publication Data

US 2008/0049813 A1 Feb. 28, 2008

(30) Foreign Application Priority Data

Aug. 25, 2006 (JP) ................................. 2006-229565

(51) Int. Cl.
*H04J 1/16* (2006.01)
(52) U.S. Cl. ........ 370/252; 370/204; 370/255; 370/278; 370/345
(58) Field of Classification Search ................. 370/278, 370/310, 345, 346, 254, 255, 277, 431, 445, 370/447, 203, 204, 468
See application file for complete search history.

(56) References Cited

U.S. PATENT DOCUMENTS

| | | | | |
|---|---|---|---|---|
| 2004/0022213 | A1* | 2/2004 | Choi et al. | 370/332 |
| 2005/0191965 | A1* | 9/2005 | Yu et al. | 455/67.16 |
| 2005/0243793 | A1* | 11/2005 | Kim et al. | 370/347 |
| 2006/0072510 | A1* | 4/2006 | Aizawa | 370/333 |
| 2007/0026808 | A1* | 2/2007 | Love et al. | 455/67.7 |
| 2007/0026810 | A1* | 2/2007 | Love et al. | 455/67.11 |
| 2007/0047502 | A1* | 3/2007 | Marinier et al. | 370/335 |
| 2009/0010354 | A1 | 1/2009 | Sudo | |
| 2009/0067329 | A1* | 3/2009 | Sumasu et al. | 370/232 |
| 2009/0109999 | A1* | 4/2009 | Kuri et al. | 370/465 |

FOREIGN PATENT DOCUMENTS

| | | |
|---|---|---|
| JP | 2006-135555 A | 5/2006 |
| WO | 2005/125139 A1 | 12/2005 |
| WO | 2006/080360 A1 | 8/2006 |

OTHER PUBLICATIONS

Japanese Office Action dated Jul. 5, 2011 as received in related application No. 2006-229565.
Japanese Office Action dated Sep. 26, 2011 as received in related application No. 2006-229565.
Jalali et al: "Data Throughput of CDMA-HDR a High Efficiency-High Data Rate Personal Communication Wireless System": Qualcomm, Inc., May 15, 2000.

* cited by examiner

*Primary Examiner* — Luat Phung
(74) *Attorney, Agent, or Firm* — Maschoff Gilmore & Israelsen

(57) ABSTRACT

On the basis of control information for CQI transmission of which a base station notifies a mobile station, the mobile station transmits CQI information for each sub-frame in a case of best effort type service or transmits the base station the CQI information at one time for every four sub-frames in a case of rate preservation type service.

8 Claims, 11 Drawing Sheets

| CQI | Modulation scheme | Coding rate | Information speed |
|---|---|---|---|
| 0 | | | |
| 1 | QPSK | ... | ... |
| 2 | QPSK | ... | ... |
| 3 | QPSK | ... | ... |
| 4 | QPSK | ... | ... |
| 5 | QPSK | ... | ... |
| 6 | QPSK | ... | ... |
| 7 | QPSK | ... | ... |
| 8 | QPSK | ... | ... |
| 9 | QPSK | ... | ... |
| 10 | QPSK | ... | ... |
| 11 | QPSK | ... | ... |
| 12 | QPSK | ... | ... |
| 13 | QPSK | ... | ... |
| 14 | QPSK | ... | ... |
| 15 | QPSK | ... | ... |
| 16 | 16-QAM | ... | ... |
| 17 | 16-QAM | ... | ... |
| 18 | 16-QAM | ... | ... |
| 19 | 16-QAM | ... | ... |
| 20 | 16-QAM | ... | ... |
| 21 | 16-QAM | ... | ... |
| 22 | 16-QAM | ... | ... |
| 23 | 16-QAM | ... | ... |
| 24 | 16-QAM | ... | ... |
| 25 | 16-QAM | ... | ... |
| 26 | 16-QAM | ... | ... |
| 27 | 16-QAM | ... | ... |
| 28 | 16-QAM | ... | ... |
| 29 | 16-QAM | ... | ... |
| 30 | 16-QAM | ... | ... |
| 31 | | | |

CQI 0–19: Low-speed data (rate preservation type)

CQI 20–31: High-speed data (best effort type)

F I G. 8

MOBILE RADIO TERMINAL

CROSS-REFERENCE TO RELATED APPLICATIONS

This application is based upon and claims the benefit of priority from prior Japanese Patent Application No. 2006-229565, filed Aug. 25, 2006, the entire contents of which are incorporated herein by reference.

BACKGROUND OF THE INVENTION

1. Field of the Invention

The present invention relates to a radio communication system capable of urging a base station to execute adaptive control of the modulation scheme and the error-correcting-coding rate, for example, on the basis of CQI (Channel Quality Indication) which is transmitted from a mobile station to the base station.

2. Description of the Related Art

In a conventional system employing the adaptive modulation, the mobile station measures radio transmission path quality of a base station having a most desirable receiving quality, determines a receivable transmission format (i.e. combination of the modulation and the coding rate) on the basis of the measured value of the radio transmission path quality, and transmits the transmission format to the base station as CQI (Channel Quality Indication).

On the basis of CQI, the base station transmits transmission information over an individual information channel, by changing the combination of the modulation scheme of the data to be transmitted to the mobile station and the error-correcting-coding rate. In other words, when the receiving condition of the mobile station is preferable, the base station executes the transmission at a high-speed data transmission rate having a low error tolerance. When the condition of the radio waves is poor, the base station executes the transmission at a low-speed data transmission rate having a high error tolerance.

The data communications are thus made at various communication rates corresponding to the downstream receiving quality, but the determination of the downstream receiving quality is based on a table prestored in the mobile station. This table directly represents a predicted downstream data communication speed, which is a very correct data communication speed obtained by considering the correction using statistic data such as the error rates of predicted and previous downstream data transmissions.

The radio system which implements high-speed data communication by executing such adaptive modulation is generally in a best-effort type service form. For this reason, the mobile station requires the only base station of the most desirable receiving quality to make communications. The base station transmits packets, with priority, to the mobile station which requires the high transmission rate of preferable downstream receiving quality (Maximum CIR).

For this reason, the priority in making communications with the base station is low for a mobile station which does not have preferable downstream receiving quality. As a method of solving this and increasing both the user throughput and the base station throughput in good balance, for example, PF (Proportional Fairness) scheduler method of the 1xEV-DO (Evolution-Data Optimized) system is known (refer to, for example, IEEE International Conference, VTC, 2000 Spring, "Data throughput of CDMA-HDR a High Efficiency-High Data Rate Personal Communication Wireless System" written by A. Japali, R. Padovani and R. Pankaj).

The PF scheduler method employs evaluation function values calculated at "SNR_inst/SNR_ave" as an index which the base station uses for user selection. The base station calculates the evaluation functions values for the respective mobile stations and selects the mobile station which has the greatest evaluation function values. "SNR_inst" represents instantaneous SNR (Signal to Noise Ratio) of which the mobile station notifies the base station. "SNR_ave" represents an average value of SNR.

In the OFDM (Orthogonal Frequency Division Multiplexing) system, communications are made by simultaneously employing a number of subcarriers. At this time, the mobile stations can be assigned to the subcarriers, respectively. The OFDM system is similar to the conventional FDM system with respect to assigning a specific frequency to each of the mobile stations. However, the OFDM system is significantly different in the point that each mobile station receives all the subcarriers of the OFDM simultaneously, executes reception of the OFDM signals, and takes the subcarrier which it should receive.

In a system such as the OFDM system in which a plurality of resource blocks can be arranged in a direction of frequency, for a unit time, however, the amount of CQI information transmitted in response to the number of resource blocks in the frequency direction is increased as compared with the system such as the conventional EV-DO, HSDPA system in which there is only one resource block for the unit time. Therefore, deterioration of the throughput of the upstream link becomes more significant.

BRIEF SUMMARY OF THE INVENTION

The present invention has been accomplished to solve the above-described problems. The object of the present invention is to provide a mobile radio terminal capable of reducing the amount of transmitted CQI information and preventing deterioration of the throughput of the upstream link, even in a system such as the OFDM system in which a plurality of resource blocks are also arranged in the frequency direction, for the unit time.

To achieve this object, an aspect of the present invention comprises a receiver receiving cycle information which a base station connected to a network transmits to the terminal, a detector detecting each of receiving qualities of at last one resource block used for the transmission by the base station, in a cycle based on the cycle information received by the receiver, and a transmitter transmitting quality information based on the receiving qualities detected by the detector, to the base station, in a cycle based on the cycle information received by the receiver.

In the present invention, as described above, cycle information is received from the base station, the receiving quality of each of resource blocks which the base station uses for the transmission is detected in a cycle based on the cycle information, and the detected receiving quality is transmitted to the base station.

Therefore, the present invention can provide a mobile radio terminal capable of reducing the number of times of transmission of the receiving quality information and preventing the deterioration of the throughput of the upstream link, in accordance with the command from the base station.

Advantages of the invention will be set forth in the description which follows, and in part will be obvious from the description, or may be learned by practice of the invention.

Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 8 is an illustration showing a CQI table which is used by a mobile station according to a second embodiment of the present invention;

DETAILED DESCRIPTION OF THE INVENTION

Embodiments of the present invention will be explained below with reference to the accompanying drawings.

First, a resource block employed in the communication between a base station connected to a network and a mobile station is described. In the present invention, a group of subcarriers in 1 sub-frame is called resource block and the subcarriers are assigned to the mobile station by unit of the resource block, similarly to IEEE International Conference, VTC, 2000 Spring, "Data throughput of CDMA-HDR a High Efficiency-High Data Rate Personal Communication Wireless System" written by A. Japali, R. Padovani and R. Pankaj, as cited in the BACKGROUND OF THE INVENTION.

Figure 1:
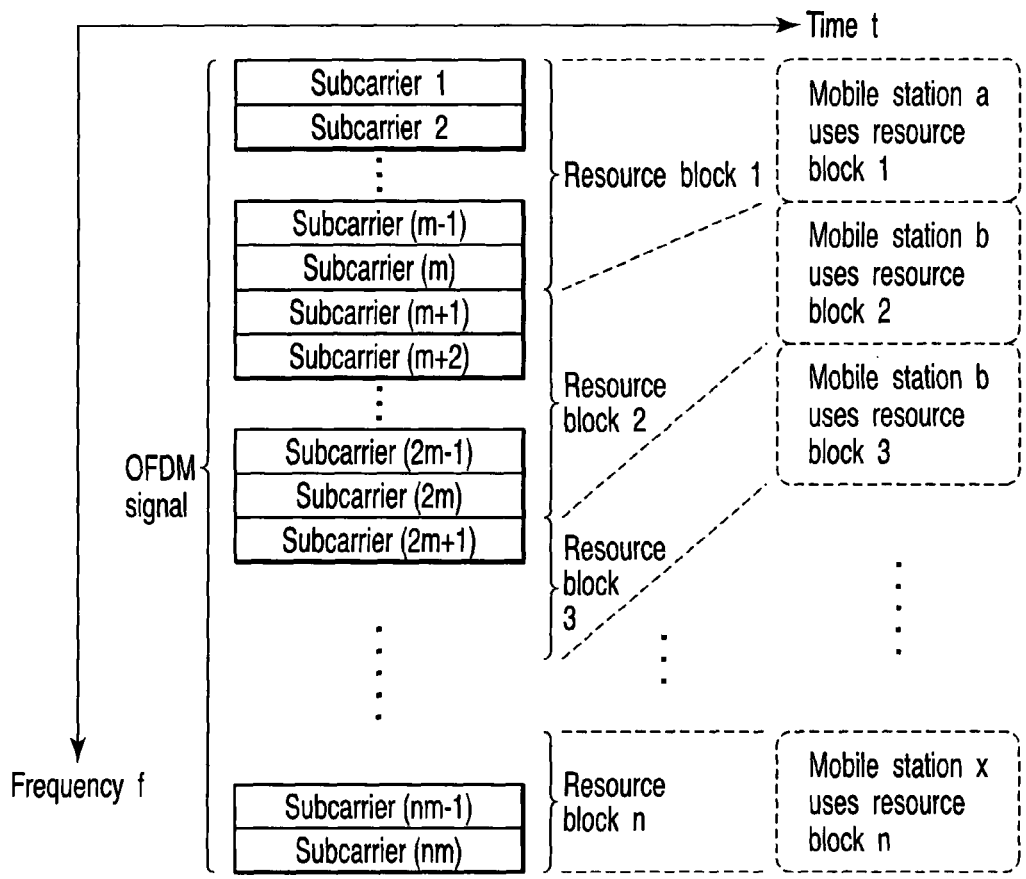
FIG. 1 is an illustration describing an OFDM signal which is used in an OFDM system according to the present invention.

In FIG. 1, an OFDM signal is composed of number n×m of subcarriers. One resource block is composed of number m of subcarriers, which are grouped into number n of resource blocks. The base station can also assign a plurality of resource blocks to one mobile station. The resource block is composed of number m of subcarriers, but 1 subcarrier is 1 resource block when m=1.

The present inventors also conceives combination of the technique of EV-DO system and the technique of OFDM system. If these techniques are combined, the following radio communication system employing the frequency band allocation control and the modulation and encoding adaptive control can be formed. In the OFDM system, the mobile station measures the radio transmission path quality of each band (resource block), specifies the base station of the most desirable receiving quality, and transmits to the base station the measurement result of the radio transmission quality as CQI. The base station receives the CQI from a plurality of mobile stations in a cover area of the own station, determines on the basis of the CQI which mobile station is assigned to the individual information channel on which the transmission information is carried for each resource block, and notifies the mobile station of a transmission format (modulation scheme and error-correcting-encoding rate) and band information (resource block position information) employed for the transmission.

Figure 2:
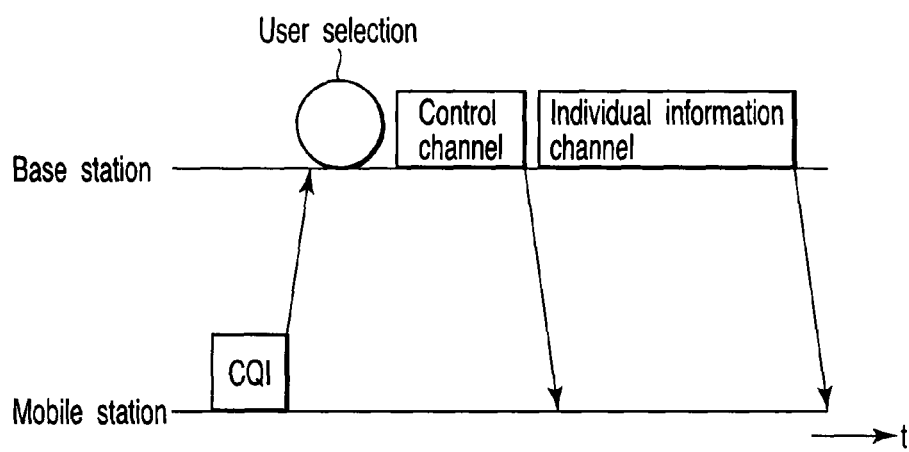
FIG. 2 is an illustration describing band allocation executed between a base station and a mobile station in the OFDM system according to the present invention.

With reference to FIG. 2, the mobile station transmits the CQI of each resource block to the base station. The base station determines the mobile station (user) to be assigned to each resource block (user selection), transmits the control channel, and notifies the mobile station of the control information including the information (modulation scheme and error-correcting-encoding rate) of the transmission format of the individual information channel and the band information (resource block position information) to be employed. The mobile station thereby receives the individual information channel transmitted from the base station, on the basis of the control information carried on the control channel.

Next, a schematic sequence in a case where the mobile station downloads the data from the base station is described with reference to FIG. 3.

First, the mobile station in a standby state transmits a communication request (S1) including at least information indicating the kind of service to be used, to the base station. When the base station receives the communication request (S1), the base station transmits Ack (S2) to the mobile station to notify the mobile station of the reception of the communication request, and further notifies the mobile station of control information (S3) for assignment of Traffic Channel. The Traffic Channel assignment control information (S3) includes information necessary for use of the upstream and downstream communication channels, control information for CQI transmission, etc. Transmission of the control information for CQI transmission may be executed in step S7 as explained later.

In the above explanation, the mobile station starts communication. When the base station transmits incoming information to the mobile station, the base station transmits the Traffic Channel assignment control information (S3) to the mobile station after the incoming information. At the incoming, the transmitter notifies the base station of at least the information indicating the kind of service to be provided. The CQI transmission control information includes information generated by the base station in accordance with the kind of the service to be provided, at the outgoing or incoming time.

When the mobile station receives the Traffic Channel assignment control information, the mobile station transmits Pilot and control information over an uplink channel (uplink) (S4). The base station receives the Pilot and the control information, measures the receiving quality of the uplink, and determines the uplink communication rate (modulation scheme and error-correcting-encoding rate) of the mobile station on the basis of the measurement result. In addition, when the base station receives the Pilot and the control information from the mobile station, the base station transmits Ack (S5) to notify the mobile station of the reception of the Pilot and the control information.

The mobile station notifies the base station of the matter that the Traffic Channel assignment is completed (S6). At this time, the mobile station and the base station are capable of communications. After that, authentication/setting such as authentication of the mobile station, reception of the CQI table, etc. are executed between the mobile station and the base station (S7), and the mobile station executes the CQI transmission shown in FIG. 2 (S8). Then, as explained above, the base station executes scheduling for determining the transmission format and the band (resource block), notifies the mobile station of the scheduling (S9), and transmits the data over the individual information channel on the basis of the notification (S10). FIG. 3 shows a typical sequence for starting the communication by the mobile station, but the present invention is not limited to this.

Next, embodiments in the time direction and the frequency direction, of an OFDMA system in an any-time applying type and a regular updating type are described. The embodiment in the time direction aim to reduce the CQI transmission frequency. For this reason, it can be applied to systems of time-division multiplexing the users such as the EV-DO system and the HSDPA (High Speed Downlink Packet Access) system, and systems of frequency-division multiplexing the users such as LTE (Long Term Evolution) system (OFDMA) that is now reviewed.

The embodiment in the frequency direction can be applied to systems of frequency-division multiplexing the users such as the LTE system (OFDMA) that is now reviewed, or systems in which a plurality of resource blocks are present by unit time. The embodiment can also be applied to systems of transmitting CQI of each resource block to each antenna by employing, for example, MIMO (Multi-Input Multi-Output) technique to the present invention.

Figure 4:
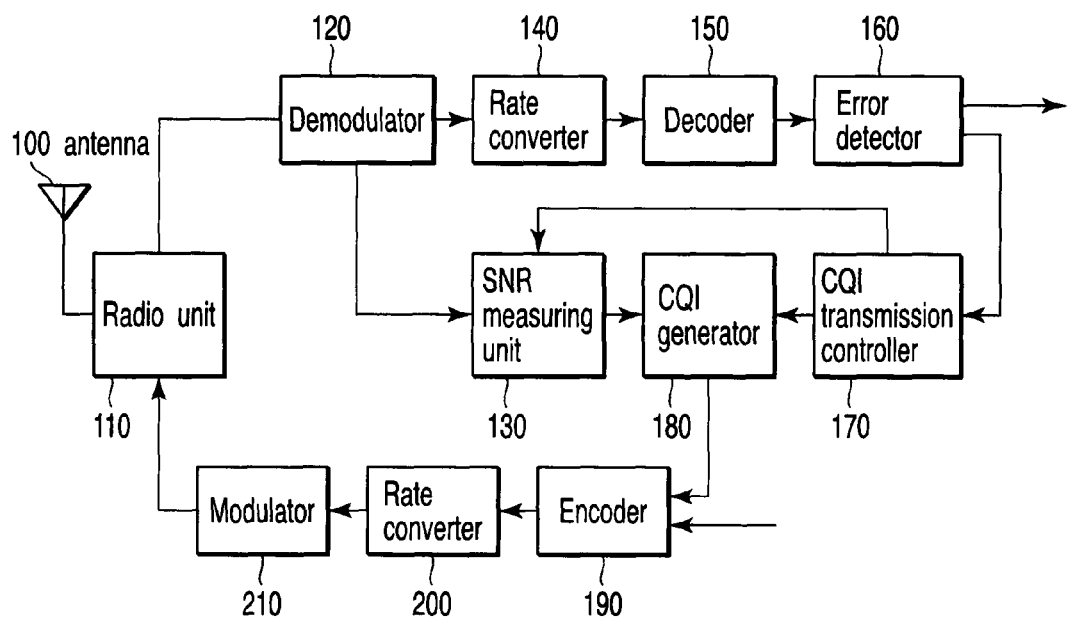
FIG. 4 is a block diagram showing a configuration of the mobile station according to the present invention.

FIG. 4 shows a configuration of a mobile radio terminal according to the embodiment of the present invention, i.e. the above-described mobile station. The apparent configuration of the mobile station is the same in first to sixth embodiments to be described later. For this reason, the configuration of the mobile station shown in FIG. 4 is commonly employed to avoid repetition of lengthy explanations.

The mobile station comprises an antenna 100, a radio unit 110, a demodulator 120, an SNR measuring unit 130, a rate converter 140, a decoder 150, an error detector 160, a CQI transmission controller 170, a CQI generator 180, an encoder 190, a rate converter 200, and a modulator 210.

In the mobile station having this configuration, a radio signal received from the base station via the antenna 100 is amplified and filtered by the radio unit 110, and then demodulated by the demodulator 120. In accordance with instructions from the CQI transmission controller 170, the SNR measuring unit 130 measures the SNR (SNR) of the Pilot channel received from the base station and measures the receiving quality of each resource block of the downlink channel.

The control information is transmitted from the base station on the control channel shown in FIG. 2, at a determined rate. For this reason, the rate converter 140 converts the demodulation result of the demodulator 120 at the determined rate and the conversion result is processed with punctured or repeated parity bits at the base station side. This processing result is subjected to error-correcting-decoding by the decoder 150 to obtain the control information.

The error detector 160 executes error detection on the decoded control information with an error-detection code added to the control information. If no errors are detected, the error detector 160 discriminates whether or not individual information for the own moving station exists, on the basis of the control information. If an error is detected, the error detector 160 extracts MCS (modulation scheme and error-correcting-coding rate) information of the individual information channel from the control information.

On the basis of the MCS information, the individual information channel is subjected to demodulation by the demodulator 120, rate-conversion by the rate converter 140, and error-correcting-decoding by the decoder 150, simultaneously with the reception of the control information, to execute decoding. The mobile station thereby receives the control information and the individual information channel transmitted from the base station. In addition, the data transmitted from the base station is output to a data processor (not shown) of a subsequent stage.

The control information includes control information for CQI transmission transmitted to the own mobile station, besides the information concerning the individual information. The control information for CQI transmission mainly includes a CQI table, a CQI transmission cycle, initial CQI transmission timing information, etc. The control information for CQI transmission is output to the CQI transmission controller 170 and stored therein. The control information for CQI transmission includes information items other than the above in accordance with the embodiments described later, but they are described in detail in the respective embodiments.

On the basis of the control information for CQI transmission, the CQI transmission controller 170 controls the SNR measurement of the SNR measuring unit 130 and the CQI generation of the CQI generator 180. In accordance with instructions from the CQI transmission controller 170, the CQI generator 180 compares the measurement result of the SNR measuring unit 130 with the CQI table of which the CQI generator 180 is notified by the CQI transmission controller 170, determines the CQI value for each resource block, and outputs the determined CQI value as CQI information. When the communications are started, the CQI generator 180 corrects the threshold value represented by the CQI table, with statistic data such as the previous downlink data transmission error rate, etc. as described above.

The encoder 190 encodes the data which has been output from the data processor and should be transmitted, various kinds of control information, and the CQI information generated by the CQI generator 180. The rate converter 200 converts the encoding result of the encoder 190. With the conversion result, the modulator 210 modulates the carrier waves. The radio unit 110 upconverts the modulation result into a radio frequency and transmits the radio frequency to the base station via the antenna 100.

Next, operations of the mobile station according to the first embodiment are described. In this embodiment, the base station reduces the number of times of CQI transmission by setting a CQI transmission cycle for each of the mobile stations in accordance with QoS (Quality of Service) of each mobile station and, consequently, the signaling overhead of the CQI of the uplink is decreased. For this reason, the present embodiment is an embodiment in the time direction and can also be applied to a system using one resource block by the unit time, such as HSDPA and EV-DO.

The service used by the mobile station is roughly divided into two kinds, i.e. a best effort type service such as web browsing in which delay does not need to be considered, and a rate preservation type service such as VoIP (Voice over Internet Protocol), TV Phone, etc. in which delay is not permitted. In general, the rate preservation type service is operated at a lower rate than the best effort type service. Since delay is not permitted in the rate preservation type service, priority of the resource assignment in the base station is higher in the rate preservation type service than that in the best effort type service.

Figure 3:
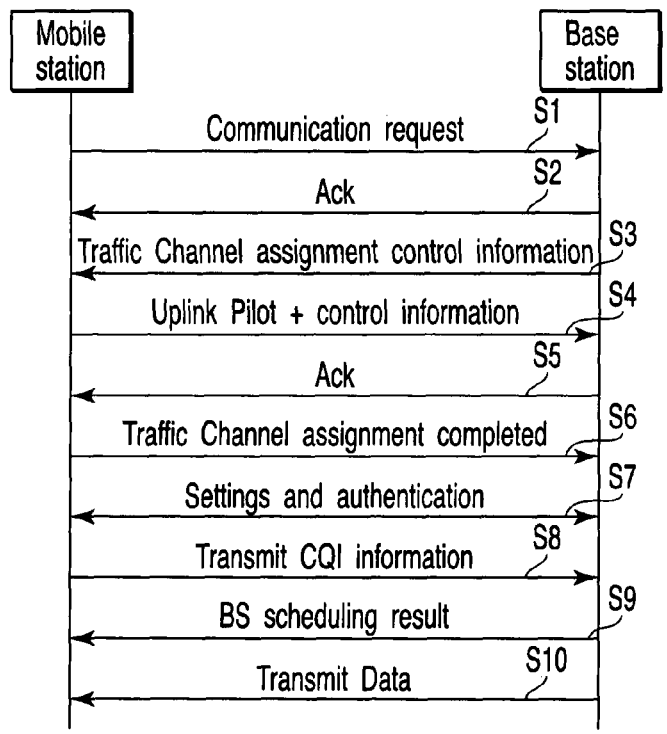
FIG. 3 is an illustration describing a sequence of communications made when communication is started between the base station and the mobile station in the OFDM system according to the present invention.

When the communication is started by the mobile station, the base station considering the characteristics of these kinds of service discriminates whether the communication to be executed by the mobile station is the best effort type service or the rate preservation type service, on the basis of the kind of the services included in the communication request received from the mobile station at S1 of the sequence shown in FIG. 3. In addition, the base station discriminates whether the communication to be executed with the mobile station is the best effort type service or the rate preservation type service, on the basis of the kinds of services included in the incoming information transmitted from the caller, at the incoming call to the mobile station.

When the base station thus discriminates the kind of the communication, the mobile station determines the cycle of transmitting the CQI information as the CQI transmission cycle on the basis of the discriminated kind of the communication and transmits the control information for CQI transmission including the CQI transmission cycle as a kind of information, to the corresponding mobile station, for example, in steps S3 and S7 of the sequence shown in FIG. 3.

More specifically, as the CQI transmission cycle, for example, CQI are transmitted for each 1 sub-frame similarly to the conventional manner, in the case of the best effort type service, while CQI are transmitted at one time for each 4 sub-frames in the case of the rate preservation type service. The rate preservation type service is set to be provided in a longer cycle (low frequency) as compared with the best effort type service.

Figure 5:
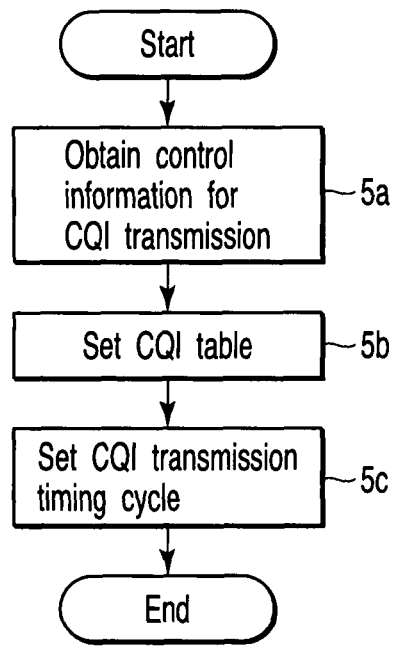
FIG. 5 is a flowchart of operations of the mobile station according to a first embodiment of the present invention.

In the mobile station, when no errors are detected in the control information for CQI transmission transmitted to the own station which includes the CQI transmission cycle determined as explained above, by the error detector 160, and the control information is obtained by the decoder 150, the CQI transmission controller 170 executes a processing shown in the flowchart of FIG. 5.

In step 5a, the CQI transmission controller 170 obtains the control information for CQI transmission from the information input from the error detector 160 from which the error detection codes are excluded, and stores the control information for CQI transmission. The operation shifts to step 5b.

In step 5b, the CQI transmission controller 170 outputs the CQI table included in the control information for CQI transmission to the CQI generator 180. The operation shifts to step 5c.

In step 5c, the CQI transmission controller 170 outputs the CQI transmission cycle and the initial CQI transmission timing information included in the control information for CQI transmission to the SNR measuring unit 130 and the CQI generator 180.

Thus, the SNR measuring unit 130 sets the CQI transmission cycle and the initial CQI transmission timing information received from the CQI transmission controller 170 in step 5c as the measuring timing of the SNR of each resource block. In other words, the SNR measuring unit 130 starts the SNR measurement of each resource block on the basis of the timing based on the initial CQI transmission timing information. After that, the SNR measuring unit 130 executes the SNR measurement of each resource block in the cycle represented by the CQI transmission cycle.

The CQI generator 180 compares the threshold value represented by the CQI table received in step 5b with the SNR of each resource block measured by the SNR measuring unit 130, and detects the CQI value which corresponds to the threshold value corresponding to the SNR. In addition, to transmit the CQI value of each resource block as the CQI information in the cycle designated by the base station, the CQI generator 180 outputs the CQI information to the encoder 190, at the timing based on the CQI transmission cycle and the initial CQI transmission timing information received from the CQI transmission controller 170 in step 5c.

In other words, the CQI generator 180 starts outputting the CQI information to the encoder 190, at the timing based on the initial CQI transmission timing information, in synchronization with the SNR measuring unit 130. After that, the CQI generator 180 output the CQI information to the encoder 190 in the cycle represented by the CQI transmission cycle.

Figure 6:
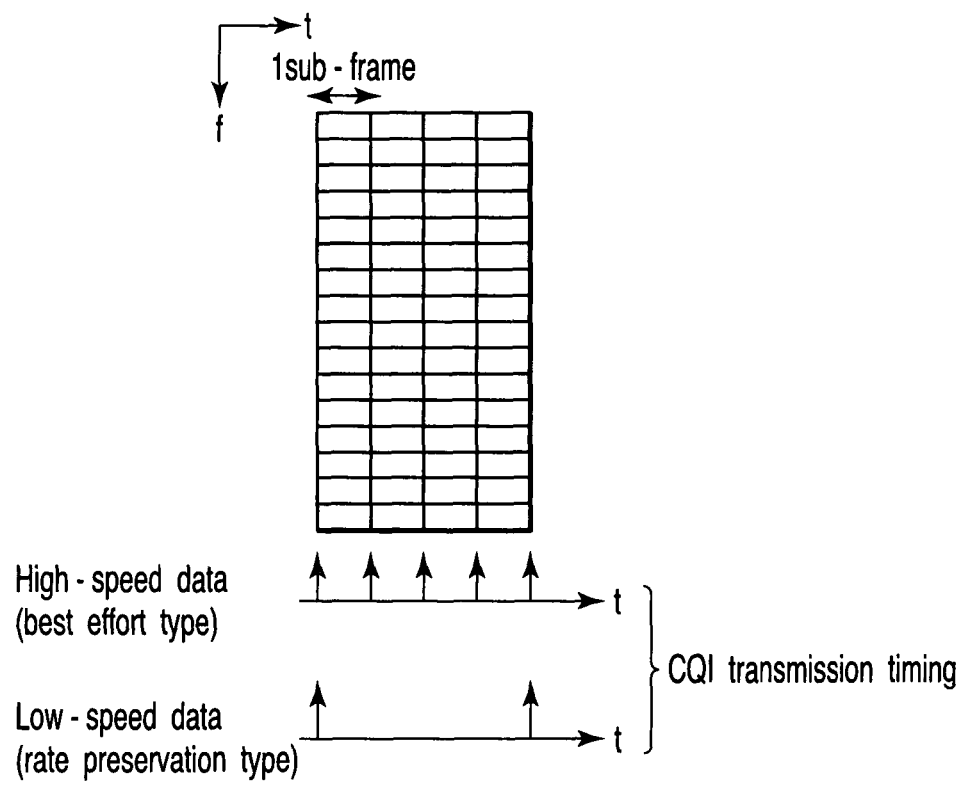
FIG. 6 is an illustration describing a CQI transmission timing of the mobile station according to a first embodiment of the present invention.

In the mobile station having the above-described configuration, the CQI information is transmitted to the base station for every 1 sub-frame in the case of the best effort type service or transmitted at one time for every 4 sub-frames in the case of the rate preservation type service, as shown in FIG. 6, on the basis of the control information for CQI transmission.

Therefore, the SNR measurement and the transmission of the CQI information are executed in a quarter cycle in the case of the rate preservation type service as compared with the case of the best effort type service. Thus, the CQI transmission frequency can be reduced and the power consumption can be decreased. In addition, since reception of the control channel from the base station in association with the CQI transmission shown in FIG. 2, does not need to be executed, the power consumption relating to the reception can also be decreased. In the base station, the CQI reception relating to the sub-frame in which the mobile station does not transmit the CQI does not need to be executed, and the number of uses to be selected is reduced. Therefore, the resource employed for this processing can be saved.

In the above-described embodiment, one kind of CQI transmission cycle is determined for one service, but the present invention is not limited to this. A plurality of different CQI transmission cycles may be defined for one service. The CQI transmission cycle in the case of the rate preservation type service is set as a longer cycle (lower frequency) as compared with the case of the best effort type service. However, the CQI transmission cycle in the case of the best effort type service may be set as a longer cycle (lower frequency) as compared with the case of the rate preservation type service. The kind of service is roughly divided into the best effort type and the rate preservation type, but the CQI transmission cycle may be varied on the basis of the same kind of rate preservation type service. Consequently, each CQI transmission cycle is defined in accordance with the kind of service.

In addition, it is considered that the base station transmits the data to the mobile station in the sub-frame in which the mobile station does not execute the CQI transmission. For this reason, the mobile station may receive the control information over the control channel shown in FIG. 2 from the base station, monitor the contents of the control information, and receive the data transmitted from the base station on the basis of the contents.

In this case, the base station may select the user by using the latest CQI value, or may monitor the temporal variation of the CQI of each mobile station, estimate the state of the subframe which the base station does not receive by using a CQI value interpolating the monitored temporal variation and select the user on the basis of the estimation result.

Figure 7:
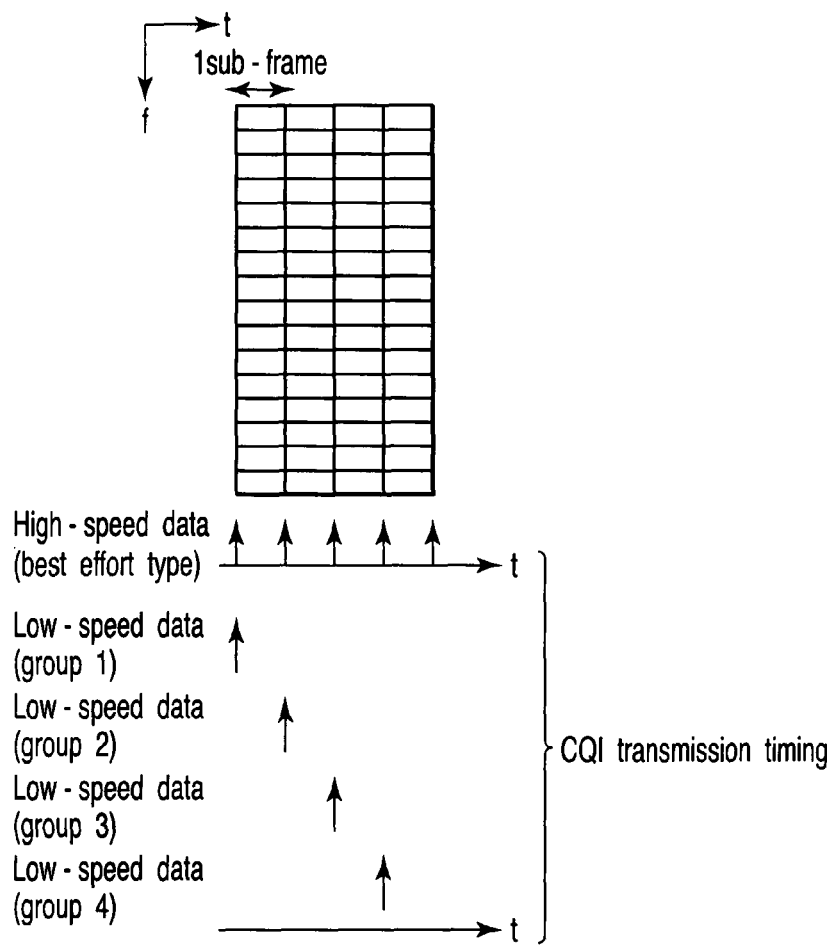
FIG. 7 is an illustration describing a modified example of a CQI transmission timing of the mobile station according to a first embodiment of the present invention.

In addition, the CQI transmission timing is determined for each mobile station. As shown in FIG. 7, however, the base station may classify a plurality of mobile stations into groups and determine the CQI transmission timing (CQI transmission cycle and initial CQI transmission timing) for each group by considering, for example, the number of mobile stations, the amount of interference, the kind of service, etc.

Furthermore, the base station determines the CQI transmission cycle and the mobile station transmits the CQI information in the CQI format based on the determined CQI transmission cycle. However, for example, the mobile station may determine the CQI transmission cycle in accordance with the service and transmit the CQI information in the CQI format based on the determined CQI transmission cycle. In the CQI format, the base station receives the CQI information. For this purpose, the mobile station notifies the base station of the CQI format, at the initial communication stage, or in each certain cycle. In this case, the mobile station may transmit the CQI information in the CQI format after notifying the base station of the CQI format and obtaining the permission of the base station.

Next, operations of the mobile station according to the second embodiment are described. In this embodiment, the base station reduces the number of bits of CQI transmission by making the use range of the CQI table variable for each of the mobile stations in accordance with QoS (Quality of Service) of each mobile station and, consequently, the signaling overhead of the CQI of the uplink is decreased. For this reason, the present embodiment is an embodiment in the time direction and can also be applied to a system using one resource block by the unit time, such as HSDPA and EV-DO.

In general, the rate preservation type service in which delay is not permitted is operated at a lower rate than the best effort type service such as web browsing in which delay does not need to be considered, as described in the first embodiment. To give priority to the mobile station utilizing the rate preservation type service, the base station executes user selection by distinguishing the mobile station utilizing the best effort type service and the mobile station utilizing the rate preservation type service and assigning the resource blocks thereto.

In the second embodiment, when the communication is started by the mobile station, the base station considering the characteristics of these kinds of service discriminates whether the communication to be executed by the mobile station is the best effort type service or the rate preservation type service, on the basis of the kind of the service included in the communication request received from the mobile station at S1 of the sequence shown in FIG. 3. In addition, the base station discriminates whether the communication to be executed with the mobile station is the best effort type service or the rate preservation type service, on the basis of the kinds of services included in the incoming information transmitted from the caller, at the incoming call to the mobile station.

When the base station thus discriminates the kind of the communication, the mobile station determines the range of the CQI table employed by the mobile station and transmits the control information for CQI transmission which includes the information indicating the determined range (hereinafter called CQI range information) as a kind of information, to the corresponding mobile station, for example, in steps S3 and S7 of the sequence shown in FIG. 3.

More specifically, the base station orders the mobile station which is to utilize the best effort type service to determine the CQI value from all the CQI tables as shown in FIG. 8. On the other hand, the base station orders the mobile station which is to utilize the best effort type service to determine the CQI value from the CQI tables corresponding to the transmission rate of the range which is required for the service, of all the CQI tables as shown in FIG. 8.

Figure 9:
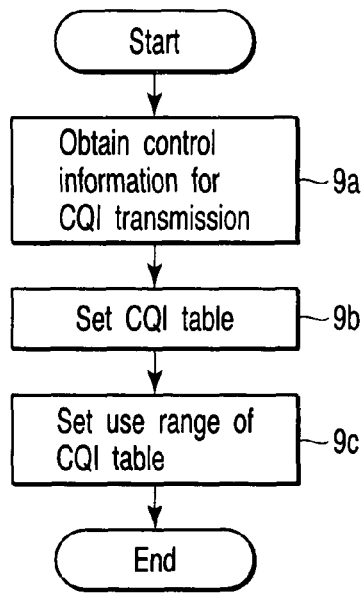
FIG. 9 is a flowchart of operations of the mobile station according to the second embodiment of the present invention.

In the mobile station, when no errors are detected in the control information for CQI transmission transmitted to the own station which includes the CQI transmission cycle determined as explained above, by the error detector 160, and the control information is obtained by the decoder 150, the CQI transmission controller 170 executes a processing shown in the flowchart of FIG. 9.

In step 9a, the CQI transmission controller 170 obtains the control information for CQI transmission from the information from which the error detection codes are excluded, as input from the error detector 160, and stores the control information for CQI transmission. The operation shifts to step 9b.

In step 9b, the CQI transmission controller 170 outputs the CQI table included in the control information for CQI transmission to the CQI generator 180. The operation shifts to step 9c.

In step 9c, the CQI transmission controller 170 outputs the CQI range information included in the control information for CQI transmission to the CQI generator 180, and outputs the CQI transmission cycle and the initial CQI transmission timing information to the SNR measuring unit 130 and the CQI generator 180.

Thus, the SNR measuring unit 130 sets the CQI transmission cycle and the initial CQI transmission timing information received from the CQI transmission controller 170 as the measuring timing of the SNR of each resource block. In other words, the SNR measuring unit 130 starts the SNR measurement of each resource block on the basis of the timing based on the initial CQI transmission timing information. After that, the SNR measuring unit 130 executes the SNR measurement of each resource block in the cycle represented by the CQI transmission cycle.

The CQI generator 180 compares the threshold value of the CQI in the range represented by the CQI range information obtained in step 9c, of the CQI table obtained in step 9b, with the SNR of each resource block measured by the SNR measuring unit 130, and detects the CQI value which corresponds to the threshold value corresponding to the SNR. The SNR outside the range is regarded as the value on the boundary of the range, and the CQI value is detected.

In addition, to transmit the CQI value of each resource block as the CQI information in the cycle designated by the base station, the CQI generator 180 outputs the CQI information to the encoder 190, at the timing based on the CQI transmission cycle and the initial CQI transmission timing information received from the CQI transmission controller 170 in step 9c.

In other words, the CQI generator 180 starts outputting the CQI information to the encoder 190, at the timing based on the initial CQI transmission timing information, in synchronization with the SNR measuring unit 130. After that, the CQI generator 180 output the CQI information to the encoder 190 in the cycle represented by the CQI transmission cycle.

In the mobile station having the above-described configuration, the CQI value is determined for each sub-frame by utilizing the CQI table of the wide range in the case of the best effort type service, and the CQI value is determined for each resource block by utilizing the CQI table of the narrow range in the case of the rate preservation type service, as shown in FIG. 8, on the basis of the control information for CQI transmission.

Therefore, in the case of rate preservation type service, higher order bits representing the CQI information can be reduced as compared with the best effort type service. For example, if CQI values 0-7 alone are used, they can be expressed at three bits. Thus, they can be reduced by two bits as compared with a case of using CQI values 0-32 (five bits).

In the above-described embodiment, one kind of CQI transmission cycle is determined for one service, but the present invention is not limited to this. A plurality of different CQI transmission cycles may be defined for one service.

In the above embodiment, the use range of the CQI table is limited to the low rate side, at the low rate of the rate preservation type service. For the best effort type service, however, the use range of the CQI range may be limited to the high rate side. In this case, the mobile station can omit lower order bits and can notify the base station of higher order bits alone as the CQI information. The base station may determine the use range of the CQI table in accordance with not the kind of service, but the kind of user utilizing the mobile station.

Furthermore, the base station determines the CQI transmission cycle and the mobile station transmits the CQI information in the CQI format based on the determined CQI transmission cycle. However, for example, the mobile station may determine the CQI transmission cycle in accordance with the service and transmit the CQI information in the CQI format based on the determined CQI transmission cycle. In the CQI format, the base station receives the CQI information. For this purpose, the mobile station notifies the base station of the CQI format in each certain cycle. In this case, the mobile station may transmit the CQI information in the CQI format after notifying the base station of the CQI format and obtaining the permission of the base station.

In the case of the rate preservation type service, the number of bits of the CQI information is reduced by limiting the range of the CQI table which is employed for the discrimination of the receiving quality. Instead of this, however, the CQI table for the rate preservation type service corresponds to the receiving quality of the same range, at fewer steps, as compared with the CQI table for the best effort type service. In other words, in an example shown in FIG. 8, the receiving quality can be discriminated at 32 steps but, on the CQI table for the rate preservation type service, the receiving quality of the same range is discriminated at, for example, 19 steps by lowering the resolution. Even in this case, the lower order bits of the CQI information can be reduced and the number of bits can be reduced. Otherwise, a plurality of CQI tables may be discriminated and the CQI transmission controller 170 may maintain each of the CQI table for the best effort type service and the CQI table for the rate preservation type service to detect the CQI value by referring to the CQI table designated by the base station in response to each service.

Next, an operation of the mobile station according to the third embodiment is described. In this embodiment, the base station detects the channel variations (phase rotation, CQI information, handoff conditions of the mobile station, and the speed information of the mobile station using the GPS (Global Positioning System)) of the uplink, regularly determines the CQI transmission cycle on the basis of the detection result, and notifies the mobile station of the determined CQI transmission cycle, during the communication with the mobile station. The mobile station transmits the CQI information to the base station, in the CQI transmission cycle of which the base station regularly notifies the mobile station. The total number of the CQI transmissions during the communication is thereby reduced and, consequently, the signaling overhead based on the CQI of the uplink is decreased. For this reason, the present embodiment is an embodiment in the time direction and can also be applied to a system using one resource block per unit time, such as HSDPA and EV-DO.

Figure 10:
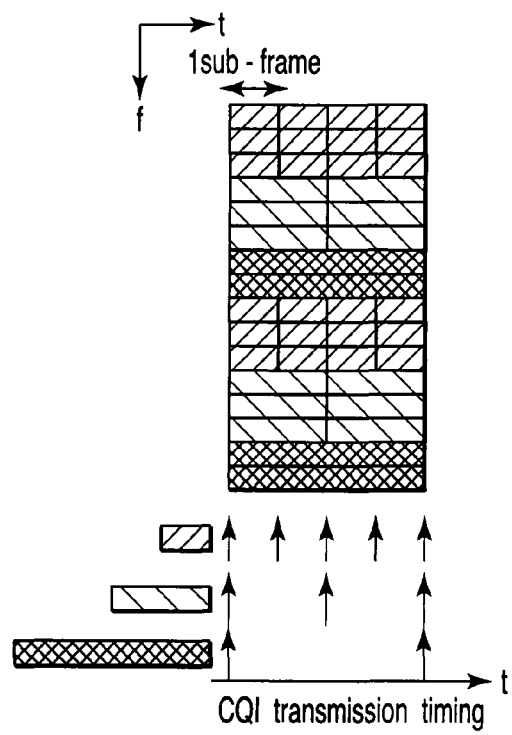
FIG. 10 is an illustration describing a CQI transmission timing of the mobile station according to a third embodiment of the present invention.

The base station defines plural kinds of sub-frames different in time length per unit, for each frequency, as shown in FIG. 10. The plural kinds of sub-frames correspond to the CQI transmission cycles in accordance with their lengths as shown in FIG. 10. To maximize the frequency diversity effect, it is preferable not to group the resource blocks of the same sub-frame length, for each frequency band, as much as possible. For this reason, it is desirable to make the sub-frame lengths different, in unit of resource blocks, in the frequency direction.

The base station analyzes the channel variation caused by monitoring an uplink Pilot channel transmitted from the mobile station, dispersion of the CQI in the time direction caused by the CQI transmission information of which the mobile station notifies the base station, or the handoff conditions of the mobile station and the position information of the mobile station, and discriminates which length in FIG. 10 the sub-frame assigned with the mobile station has. The base station periodically executes this discrimination, periodically generates control information based on the discrimination result, and notifies the mobile station of the control information. In other words, the control information includes the control information for CQI transmission. The control information for CQI transmission includes the CQI transmission cycle, the initial CQI transmission timing information, transmission band information which designates a transmission band, etc.

As for a method of designating the transmission band to the mobile station, when the resource blocks of different sub-frame lengths are assigned periodically in the frequency direction as shown in, for example, FIG. 10, the base station can assign to the mobile station the sub-frame of the length which the base station intends, by only notifying the mobile station of the sub-frame length and the bandwidth as the transmission band information. As a result, the transmission band can be designated and the downlink signaling overhead can be made smaller. The bandwidth may be designated with the number of resource blocks.

Assignment of the resource blocks of different sub-frame lengths may be at random. In addition, bias of time variation of each resource block (frequency band) may be detected on the basis of the downlink receiving qualities (for example, CQI information) of a plurality of mobile stations in the cell, and the embodiment may be operated in the arrangement determined by considering the bias. In this case, the downlink signaling overhead becomes greater while the sector throughput becomes higher as compared with the above format which is periodical in the frequency direction.

Figure 11:
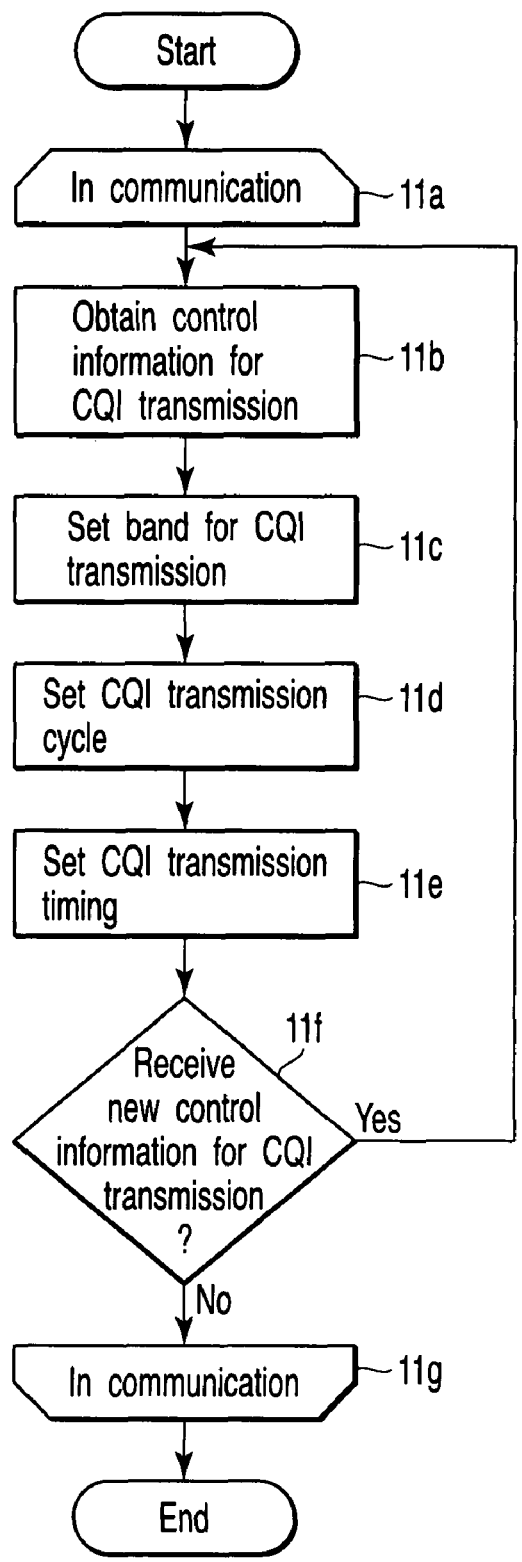
FIG. 11 is a flowchart of operations of the mobile station according to the third embodiment of the present invention.

During the communication with the base station, the CQI transmission controller 170 of the mobile station repeats a processing shown in a flowchart of FIG. 11. In other words, the CQI transmission controller 170 repeats the processing of steps 11a to 11g during the communication with the base station.

First, in step 11b, the CQI transmission controller 170 obtains the control information for CQI transmission from the information from which the error detection codes are excluded, as input from the error detector 160, and stores the control information for CQI transmission. The operation shifts to step 11c.

In step 11c, the CQI transmission controller 170 notifies the CQI generator 180 of the CQI table included in the control information for CQI transmission, and notifies the SNR measuring unit 130 and the CQI generator 180 of the resource blocks corresponding to the sub-frame length and bandwidth represented by the transmission band information included in the control information for CQI transmission, as the transmission band. Then, the operation shifts to step 11d.

In step 11d, the CQI transmission controller 170 notifies the SNR measuring unit 130 and the CQI generator 180 of the CQI transmission cycle included in the control information for CQI transmission. Then, the operation shifts to step 11e.

In step 11e, the CQI transmission controller 170 notifies the SNR measuring unit 130 and the CQI generator 180 of the CQI transmission timing information included in the control information for CQI transmission. Then, the operation shifts to step 11f.

In step 11f, the CQI transmission controller 170 discriminates whether or not new control information for CQI transmission is received from the base station. If the new control information for CQI transmission is received from the base station, the operation shifts to step 11b. If the new control information for CQI transmission is not received, the CQI transmission controller 170 repeats the discrimination until the new control information for CQI transmission is received. When the communication with the base station is ended, this processing is ended.

The SNR measuring unit 130 measures the SNR of the sub-frame corresponding to the sub-frame length designated by the transmission band of which the SNR measuring unit 130 is notified in step 11c. This measurement is executed in the CQI transmission cycle of which the SNR measuring unit 130 is notified in step 11d, at the CQI transmission timing of which the SNR measuring unit 130 is notified in step 11e.

Similarly, the CQI generator 180 compares the threshold value represented by the CQI table obtained in step 11c with the SNR of each of the resource blocks measured by the SNR measuring unit 130, and detects the CQI value which corresponds to the threshold value corresponding to the SNR. To transmit the CQI value of each of the resource blocks as the CQI information in the cycle designated by the base station, the CQI generator 180 outputs the CQI information to the encoder 190, in the CQI transmission cycle of which the CQI generator 180 is notified in step 11d, at the CQI transmission timing of which the CQI generator 180 is notified in step 11e.

In the mobile station having the above configuration, the resource block of the sub-frame length designated by the transmission band information by the base station is subjected to the CQI transmission. In addition, the CQI transmission is executed in the cycle corresponding to the sub-frame length. For this reason, for example, when the mobile station is stationary and the downlink receiving quality is stable, the number of times of CQI transmission can be reduced and the signaling overhead based on the CQI of the uplink can be decreased since the base station designates the long sub-frame length to the mobile station.

When the CQI transmission is executed for the sub-frame of a long sub-frame length, the mobile station can reduce the transmission frequency of the CQI and can decrease the power consumption. In this case, since the reception of the control channel from the base station together with the CQI transmission shown in FIG. 2 does not need to be executed, the power consumption relating to this reception can also be decreased.

In addition, since the base station monitors channel variation of the uplink during the communication with the mobile station, the base station can recognize the receiving environment of the mobile station in the cover area of the own station. For this reason, for example, if the rate of the mobile stations moving at a high speed is high, the efficiency of frequency use can be further enhanced by making the ratio of the resource block of a short sub-frame length shown in FIG. 10 higher than that of the resource block of the other length and cyclically notifying all the users of the arrangement of resource blocks having the respective lengths.

In the above embodiment, the base station determines the sub-frame length and the mobile station is transmits the CQI information in the CQI format based on the sub-frame length, but the present invention is not limited to this. For example, the mobile station may discriminate the channel variation, determine the sub-frame length corresponding to the discrimination result, and transmit the CQI information in the CQI format based on the determined sub-frame length. The base station receives the CQI information in the CQI format. For this purpose, the mobile station notifies the base station of the CQI format in each certain cycle. In this case, the mobile station may notify the base station of the CQI format, obtain the permission from the base station and transmit the CQI information in the CQI format.

An example of OFDMA (Orthogonal Frequency Division Multiple Access) is shown in FIG. 10. Otherwise, the present invention can be applied to a system using 1 resource block per unit time by arranging the resource blocks of sub-frame lengths different in the time direction, and the same advantage can also be obtained. In this case, the base station may notify the mobile station of the timing of the resource blocks of different sub-frame lengths and its cycle.

Next, an operation of the mobile station according to the fourth embodiment is described. In this embodiment, the base station detects the channel variations (phase rotation, CQI information, handoff conditions of the mobile station, and the speed information of the mobile station using the GPS) of the uplink, regularly determines the CQI transmission cycle on the basis of the detection result, and notifies the mobile station of the determined CQI transmission cycle, during the communication with the mobile station. The mobile station transmits the CQI information to the base station, in the CQI transmission cycle of which the base station regularly notifies the mobile station. The total number of the CQI transmissions during the communication is thereby reduced and, consequently, the signaling overhead based on the CQI of the uplink is decreased. For this reason, the present embodiment is an embodiment in the time direction and can also be applied to a system using one resource block per unit time, such as HSDPA and EV-DO.

Figure 12:
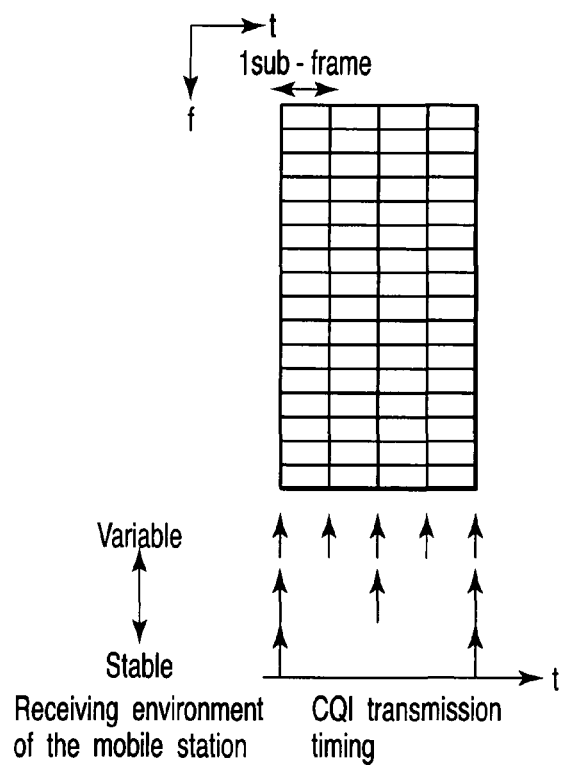
FIG. 12 is an illustration describing a CQI transmission timing of the mobile station according to a fourth embodiment of the present invention.

The base station detects the channel variation and regularly determines the CQI transmission cycle on the basis of the detection result as explained above. More specifically, a short CQI transmission cycle is set for a mobile station whose instantaneous variation in the receiving environment is radical while a long CQI transmission cycle is set for a mobile station whose receiving environment is stable, as shown in FIG. 12. This CQI transmission cycle is included in the control information for CQI transmission and is transmitted to each of the mobile stations.

Figure 13:
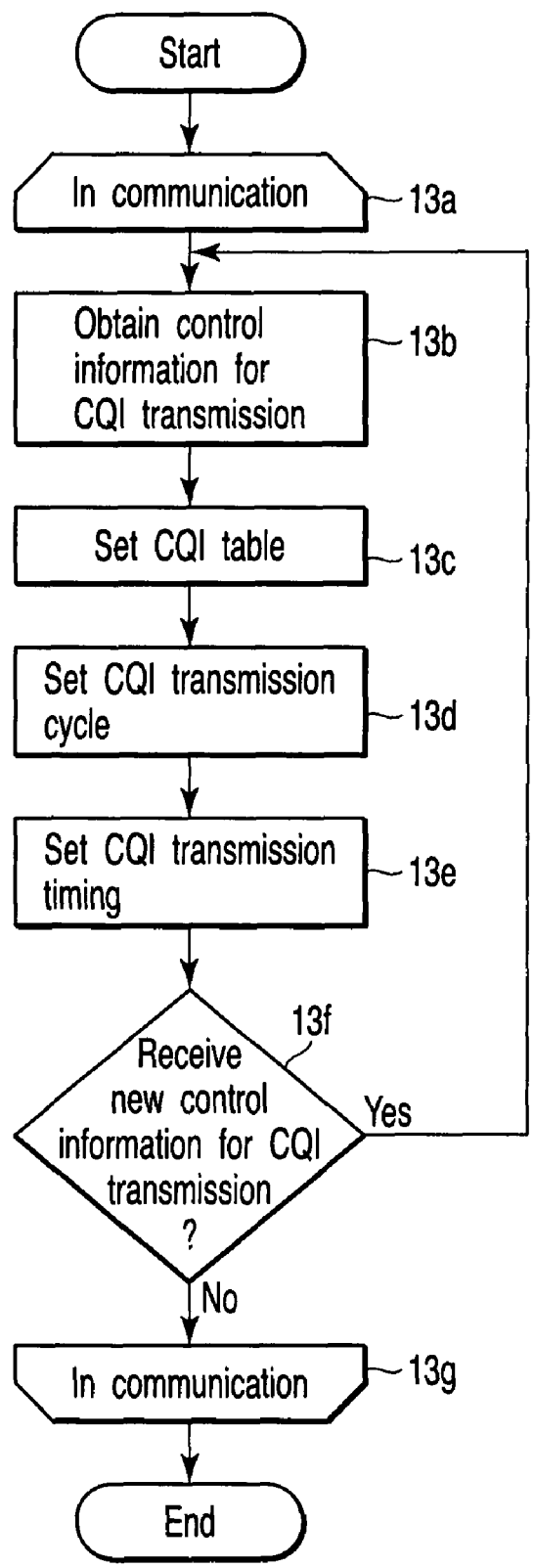
FIG. 13 is a flowchart of operations of the mobile station according to the fourth embodiment of the present invention.

During the communication with the base station, the CQI transmission controller 170 of the mobile station repeats a processing shown in a flowchart of FIG. 13. In other words, the CQI transmission controller 170 repeats the processing of steps 13a to 13g during the communication with the base station.

First, in step 13b, the CQI transmission controller 170 obtains the control information for CQI transmission from the information from which the error detection codes are excluded, as input from the error detector 160, and stores the control information for CQI transmission. The operation shifts to step 13c.

In step 13c, the CQI transmission controller 170 outputs the CQI table included in the control information for CQI transmission to the CQI generator 180. Then, the operation shifts to step 13d.

In step 13d, the CQI transmission controller 170 notifies the SNR measuring unit 130 and the CQI generator 180 of the CQI transmission cycle included in the control information for CQI transmission. Then, the operation shifts to step 13e.

In step 13e, the CQI transmission controller 170 notifies the SNR measuring unit 130 and the CQI generator 180 of the CQI transmission timing information included in the control information for CQI transmission. Then, the operation shifts to step 13f.

In step 13f, the CQI transmission controller 170 discriminates whether or not new control information for CQI transmission is received from the base station. If the new control information for CQI transmission is received from the base station, the operation shifts to step 13b. If the new control information for CQI transmission is not received, the CQI transmission controller 170 repeats the discrimination until the new control information for CQI transmission is received. When the communication with the base station is ended, this processing is ended.

The SNR measuring unit 130 measures the SNR of all the resource blocks. This measurement is executed in the CQI transmission cycle of which the SNR measuring unit 130 is notified in step 13d, at the CQI transmission timing of which the SNR measuring unit 130 is notified in step 13e.

Similarly, the CQI generator 180 compares the threshold value represented by the CQI table obtained in step 13c with the SNR of each of the resource blocks measured by the SNR measuring unit 130, and detects the CQI value which corresponds to the threshold value corresponding to the SNR. To transmit the CQI value of each of the resource blocks as the CQI information in the cycle designated by the base station, the CQI generator 180 outputs the CQI information to the encoder 190, in the CQI transmission cycle of which the CQI generator 180 is notified in step 13d, at the CQI transmission timing of which the CQI generator 180 is notified in step 13e.

In the mobile station having the above configuration, the CQI transmission is executed at the timing based on the CQI transmission cycle which the base station determines by considering the instantaneous variation of the receiving environment of each mobile station. For this reason, in the mobile station whose receiving environment is stable, the number of times of CQI transmissions can be reduced and the signaling overhead based on the CQI of the uplink can be decreased since the CQI transmission is executed in a long cycle. In the mobile station whose receiving environment is unstable, the CQI transmission following the receiving environment can be executed since the CQI transmission is executed in a short cycle.

In this embodiment, as for the sub-frame of the timing at which the CQI is not transmitted, of the mobile station to which the long CQI transmission cycle is assigned, the previously transmitted CQI value may be used or a filtering result and an interpolation result may be used. The base station may assign successive sub-frames, for the mobile station whose receiving environment is stable.

In this case, the base station notifies the mobile station of the number of the assigned, successive sub-frames, on the control channel shown in FIG. 2. The mobile station can recognize the number of sub-frames of which the own mobile station is assigned, by receiving the control information, and can receive the data transmitted from the base station by receiving the assigned, successive sub-frames.

When the long-time successive sub-frames are preliminarily assigned to a specific mobile station, the other mobile stations do not need to transmit the CQI corresponding to the sub-frames. Therefore, the base station may notify the other mobile stations by standing flags indicating that the sub-frames have already been assigned to the specific mobile station. Thus, the other mobile stations can recognize that they do not need to execute the CQI transmission for the sub-frames by receiving the control information at which the flags are made to stand and, consequently, do not receive the user selection result from the base station shown in FIG. 2. Therefore, low power consumption can be implemented.

In addition, a plurality of mobile stations whose receiving environment is stable and CQI transmission cycle becomes long may be assembled in one group as described in the first embodiment. Thus, the mobile stations using the uplink can be dispersed and the resource of the uplink can be utilized efficiently.

In the above embodiment, discrimination of the channel variation is discriminated by the base station, but may be done by the mobile stations. In this case, the same advantage can be obtained if the mobile stations notifies the base station which CQI transmission cycle is used to transmit the CQI, for each of certain cycles, and executes the CQI transmission in that cycle.

In the above embodiment, the base station determines the CQI transmission cycle by considering the instantaneous variation of the receiving environment and the mobile station transmits the CQI information in the CQI format based on the CQI transmission cycle, but the present invention is not limited to this. For example, the mobile station may determine the CQI transmission cycle by considering the instantaneous variation of the receiving environment and transmit the CQI information in the CQI format based on the determined CQI transmission cycle. Then, the base station receives the CQI information in the CQI format. For this purpose, the mobile station notifies the base station of the CQI format in each certain cycle. In this case, the mobile station may notify the base station of the CQI format, obtain the permission from the base station and transmit the CQI information in the CQI format.

Figure 14:
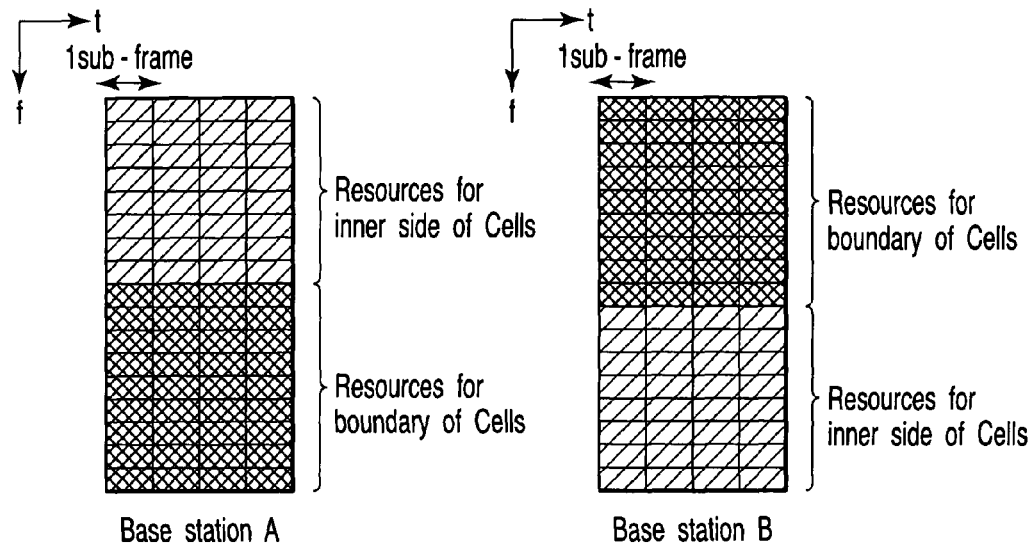
FIG. 14 is an illustration describing a CQI transmission timing of the mobile station according to a fifth embodiment of the present invention.

Next, an operation of the mobile station according to the fifth embodiment is described. In this embodiment, the resource blocks are arranged to prevent the frequency bands assigned to the mobile stations located in the vicinity of a boundary between adjacent base stations from being overlapped. In other words, the resource blocks of mutually different frequency bands are assigned to the mobile stations located in the vicinity of each boundary of cover areas (cells), between adjacent base stations A and B, as shown in FIG. 14.

This embodiment employs an interference removing technique called Interference coordination that the base stations transmit signals with a weak power, in the frequency band assigned to the mobile station located close to the base station, and transmit signals with a strong power, in the frequency band assigned to the mobile station located in the vicinity of the boundary. Thus, when the base stations can avoid the interference on the boundary between the base stations by assignment of the resource blocks.

In addition, the base station discriminates whether the mobile station is located in the vicinity of the base station or located in the vicinity of the boundary of the cover areas, on the basis of the CQI value which is received from each of the mobile stations, Ack indicating success or failure of the data reception, and measurement results such as RSSI (Received Signal Strength Indicator) of which the mobile station regularly notifies the base station. In the following explanations, the base station recognizes the position information of the mobile station on the basis of the CQI information transmitted from the mobile station. The base station cyclically executes the discrimination, cyclically generates the control information based on the discrimination result, and notifies the mobile station of the generated control information. In other words, the generated control information includes the control information for CQI transmission. The control information for CQI transmission includes the CQI transmission cycle, the CQI transmission timing information, the transmission band information for designation of the transmission band, etc.

Figure 15:
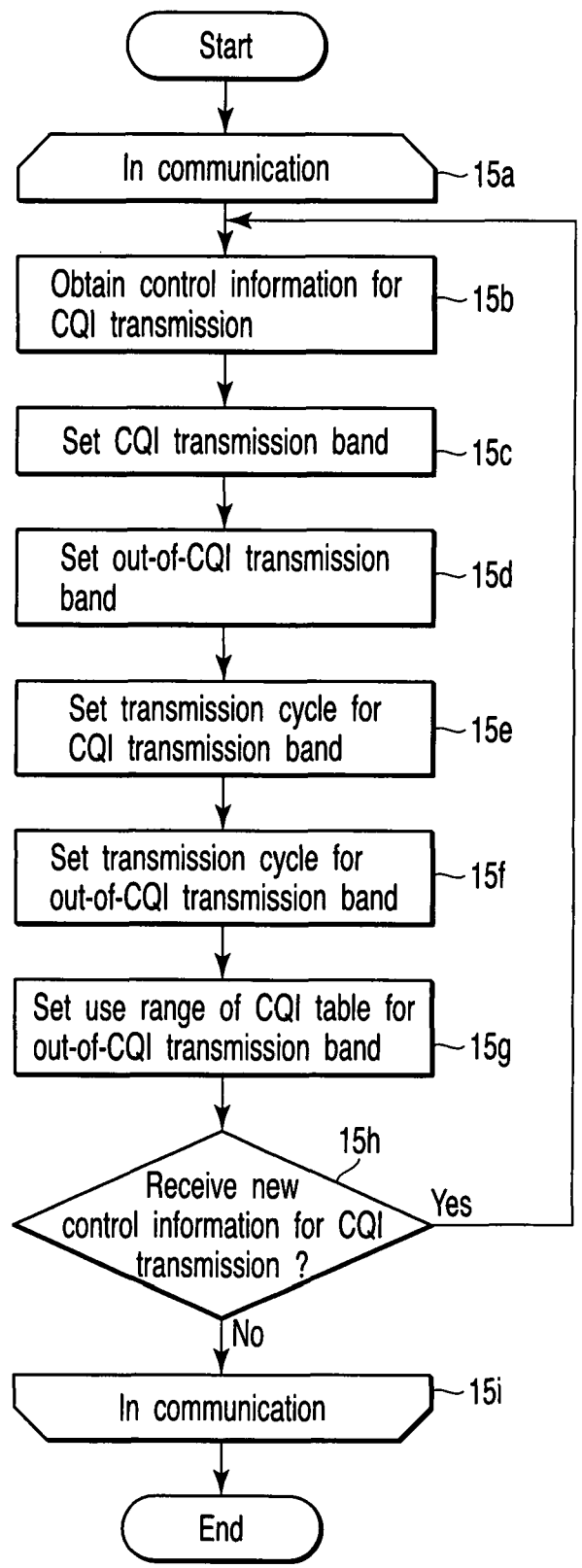
FIG. 15 is a flowchart of operations of the mobile station according to the fifth embodiment of the present invention.

During the communication with the base station, the CQI transmission controller 170 of the mobile station repeats a processing shown in a flowchart of FIG. 15. In other words, the CQI transmission controller 170 repeats the processing of steps 15a to 15g during the communication with the base station.

First, in step 15b, the CQI transmission controller 170 obtains the control information for CQI transmission from the information from which the error detection codes are excluded, as input from the error detector 160, and stores the control information for CQI transmission. The operation shifts to step 15c.

In step 15c, the CQI transmission controller 170 notifies the CQI generator 180 of the CQI table included in the control information for CQI transmission, and notifies the SNR measuring unit 130 and the CQI generator 180 of the band represented by the transmission band information included in the control information for CQI transmission as the transmission band. Then, the operation shifts to step 15d.

In step 15d, the CQI transmission controller 170 notifies the SNR measuring unit 130 and the CQI generator 180 of a band other than the band represented by the transmission band information as an out-of-transmission band. Then, the operation shifts to step 15e.

In step 15e, the CQI transmission controller 170 notifies the SNR measuring unit 130 and the CQI generator 180 of the CQI transmission cycle included in the control information for CQI transmission as the CQI transmission cycle of the transmission band. The CQI transmission controller 170 also notifies the SNR measuring unit 130 and the CQI generator 180 of the CQI transmission timing information included in the control information for CQI transmission as the CQI transmission timing of the transmission band. Then, the operation shifts to step 15f.

In step 15f, the CQI transmission controller 170 notifies the SNR measuring unit 130 and the CQI generator 180 of a prestored transmission cycle (i.e. a cycle longer than the CQI transmission cycle included in the control information for CQI transmission) as a CQI transmission cycle of the out-of-transmission band. The CQI transmission controller 170 also notifies the SNR measuring unit 130 and the CQI generator 180 of a prestored CQI transmission timing as a CQI transmission timing of the out-of-transmission band. Then, the operation shifts to step 15g.

In step 15g, the CQI transmission controller 170 outputs to the CQI generator 180 prestored CQI range information as range information of the CQI table used for generation of the CQI in the out-of-transmission band. Then, the operation shifts to step 15h.

In step 15h, the CQI transmission controller 170 discriminates whether or not new control information for CQI transmission is received from the base station. If the new control information for CQI transmission is received from the base station, the operation shifts to step 15b. If the new control information for CQI transmission is not received, the CQI transmission controller 170 repeats the discrimination until the new control information for CQI transmission is received. When the communication with the base station is ended, this processing is ended.

The SNR measuring unit 130 measures the SNR for the resource blocks of the transmission band of which the SNR measuring unit 130 is notified in step 15c. This measurement is executed in the CQI transmission cycle of which the SNR measuring unit 130 is notified in step 15e, at the CQI transmission timing of which the SNR measuring unit 130 is also notified in step 15e.

Similarly, the CQI generator 180 compares the threshold value represented by the CQI table obtained in step 15c with the SNR of each of the resource blocks of the transmission band as measured by the SNR measuring unit 130, and detects the CQI value which corresponds to the threshold value corresponding to the SNR. To transmit the CQI value of each of the resource blocks of the transmission band as the CQI information in the cycle designated by the base station, the CQI generator 180 outputs the CQI information to the encoder 190, in the CQI transmission cycle of which the CQI generator 180 is notified in step 15e, at the CQI transmission timing of which the CQI generator 180 is also notified in step 15e.

In addition, the SNR measuring unit 130 measures the SNR for the resource blocks of the out-of-transmission band of which the SNR measuring unit 130 is notified in step 15d. This measurement is executed in the CQI transmission cycle of which the SNR measuring unit 130 is notified in step 15f, in the CQI transmission timing of which the SNR measuring unit 130 is also notified in step 15f. In other words, the measurement is executed at a lower frequency than that of the resource blocks of the transmission band.

Similarly, the CQI generator 180 compares the threshold value represented by the CQI table of the range designated by the CQI range information in step 15g with the SNR of each of the resource blocks of the out-of-transmission band as measured by the SNR measuring unit 130, and detects the CQI value which corresponds to the threshold value corresponding to the SNR.

To transmit the CQI value of each of the resource blocks of the out-of-transmission band as the CQI information in the preset cycle, the CQI generator 180 outputs the CQI information to the encoder 190, in the CQI transmission cycle of which the CQI generator 180 is notified in step 15f, at the CQI transmission timing of which the CQI generator 180 is also notified in step 15f.

The base station assigns the resource blocks to the mobile stations, on the basis of the CQI information of the transmission band as transmitted from the mobile station by the above processing. On the basis of the CQI information of the transmission band and the out-of-transmission band, the base station discriminates whether the mobile station is located in the vicinity of the boundary of the cover areas or located in the vicinity of the base station. If the mobile station is located in the vicinity of the boundary of the cover areas, the resource blocks of the band which does not overlap the band used by the adjacent base stations are assigned as shown in FIG. 14.

In the mobile station having the above configuration, the resource blocks designated as the transmission band by the base station, of all the resource blocks, are subjected to CQI transmission in a shorter cycle than that resource blocks of the out-of-transmission band. Therefore, the resources used for the CQI transmission can be reduced and the signaling overhead based on the CQI of the uplink can be decreased as compared with the case where all the resource blocks are subjected to CQI transmission in the same cycle.

Furthermore, the CQI information of the resource blocks of the out-of-transmission band is generated on the basis of the CQI table in the range designated by the CQI range information. For example, a method of reducing the number of bits by lowering the resolution by decreasing the lower order bits of the CQI value as described in the second embodiment is conceived. Since the CQI information of the resource blocks of the out-of-transmission band is used by the base station to recognize the position of the mobile station, the number of bits in the CQI information can be reduced as compared with the CQI information of the resource blocks of the transmission band. In addition, the CQI transmission cycle for the resource blocks of the out-of-transmission band may be longer than the CQI transmission cycle for the resource blocks of the transmission band. In general, a desired SNR satisfying a target BLER (block error rate) is approximately 1 [dB]. However, since the notification does not need to be executed at this accuracy, the range of the CQI table is limited. Approximately lower 1 bit is preferably decreased by limiting the range of the CQI table.

In the above embodiment, the base station discriminates whether the mobile station is located in the vicinity of the base station or located in the vicinity of the boundary of the cover areas, and the mobile station transmits the CQI information in the CQI format based on the discrimination, but the present invention is not limited to this. For example, the mobile station may execute the discrimination and transmit the CQI information in the CQI format based on the discrimination. Then, the base station receives the CQI information in the CQI format. For this purpose, the mobile station notifies the base station of the CQI format in each certain cycle. In this case, the mobile station may notify the base station of the CQI format, obtain the permission from the base station and transmit the CQI information in the CQI format.

In the above embodiment, the CQI information is transmitted in the out-of-transmission band in a longer cycle than that in the transmission band (step 15*f*), and the use range of the CQI table is limited (step 15*g*) to decrease the number of bits of the CQI information. Both the processings do not need to be executed.

In other words, if the use range of the CQI table is limited, the CQI transmission cycle of the out-of-transmission band may be the same as that of the transmission band. If the CQI transmission cycle of the out-of-transmission band is longer than that of the transmission band, the use range of the CQI table may not be limited. If either of the processings is executed, the CQI information amount can be reduced.

Next, an operation of the mobile station according to the sixth embodiment is described. In this embodiment, the base station transmits to the mobile station unit information in which number n of resource blocks which are successive and different at the same time are regarded as one group, on the basis of the CQI information of which the mobile station notifies the base station. A bandwidth of the unit information is desirably an integer multiple of a bandwidth of the unit information, in consideration of the user selection scheduling of the base station.

On the basis of the unit information, the mobile station groups every number n of resource blocks which are successive and different at the same time, generates one item of the CQI information for each of groups and transmits the CQI information. The frequency bandwidth of the resource blocks is formed of one or more sub-carriers as described above. Thus, the number of bits of the CQI transmission is reduced by 1/n and, consequently, the signaling overhead based on the CQI of the uplink is decreased.

In other words, the base station obtains CQI correlation of each of the resource blocks on the basis of the CQI information of which the mobile station notifies the base station, and discriminates a coherent bandwidth. The CQI correlation in the frequency direction of the resource block in the mobile station depends on the path model. If the delay spread of the path is narrow, the coherent bandwidth becomes broad. Therefore, the CQI correlation of each sub-carrier becomes higher and the CQI value is substantially constant in the broad bandwidth. On the other hand, if the delay spread of the path is broad, the coherent bandwidth becomes narrow. Therefore, the CQI correlation of each sub-carrier becomes lower and the CQI value is substantially constant in the narrow bandwidth.

The base station cyclically executes the above discrimination, cyclically generates the control information based on the discrimination result, and notifies the mobile station of the generated control information. In other words, the generated control information includes the control information for CQI transmission. The control information for CQI transmission includes the CQI transmission cycle, the CQI transmission timing information, and unit information n based on the discrimination result, etc.

Figure 16:
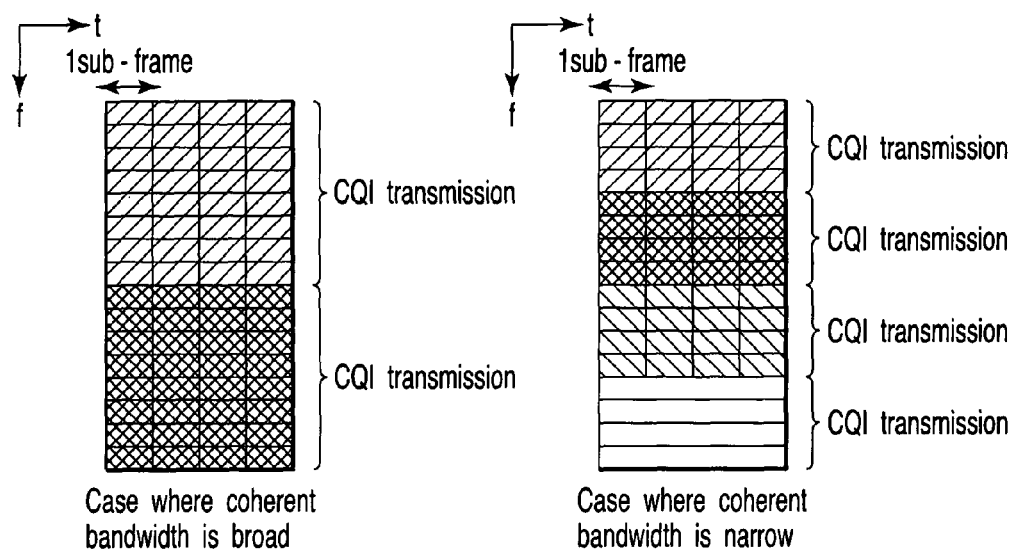
FIG. 16 is an illustration describing a CQI transmission timing of the mobile station according to a sixth embodiment of the present invention.

For this reason, if the CQI correlation is high, the base station makes the value n represented by the unit information greater so as to handle a number resource blocks as one unit, as compared with a case where the CQI correlation is low, as shown in FIG. 16.

Figure 17:
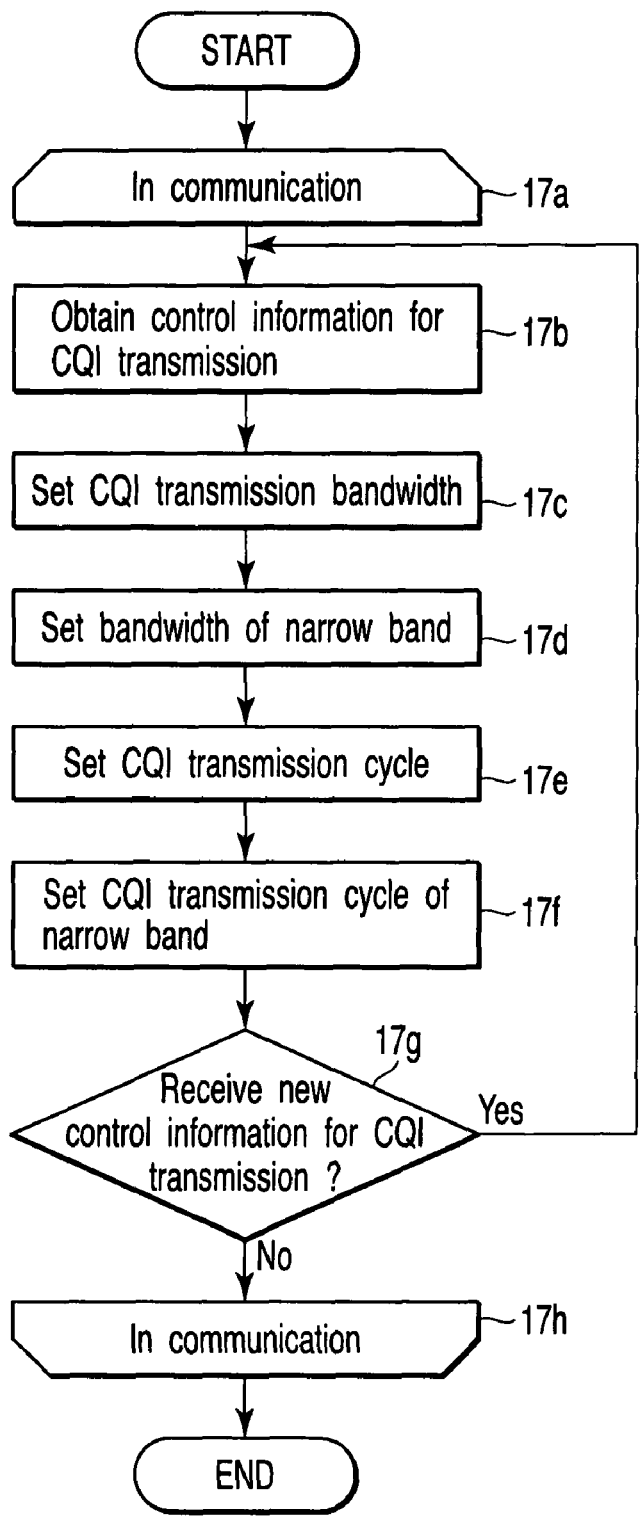
FIG. 17 is a flowchart of operations of the mobile station according to the sixth embodiment of the present invention.

During the communication with the base station, the CQI transmission controller 170 of the mobile station repeats a processing shown in a flowchart of FIG. 17. In other words, the CQI transmission controller 170 repeats the processing of steps 17*a* to 17*h* during the communication with the base station.

First, in step 17*b*, the CQI transmission controller 170 obtains the control information for CQI transmission from the information from which the error detection codes are excluded, as input from the error detector 160, and stores the control information for CQI transmission. The operation shifts to step 17*c*.

In step 17*c*, the CQI transmission controller 170 notifies the CQI generator 180 of the CQI table included in the control information for CQI transmission, and notifies the SNR measuring unit 130 and the CQI generator 180 of the number of blocks n represented by the unit information included in the control information for CQI transmission as the bandwidth for CQI transmission. Then, the operation shifts to step 17*d*.

In step 17*d*, the CQI transmission controller 170 notifies the SNR measuring unit 130 and the CQI generator 180 of a value m which is equal to or smaller than the number of blocks n as narrow bandwidth m on the basis of the number of blocks n represented by the unit information. Then, the operation shifts to step 17*e*.

In step 17*e*, the CQI transmission controller 170 notifies the SNR measuring unit 130 and the CQI generator 180 of the CQI transmission cycle included in the control information for CQI transmission as a CQI transmission cycle of the transmission bandwidth n. The CQI transmission controller 170 also notifies the SNR measuring unit 130 and the CQI generator 180 of the CQI transmission timing information included in the control information for CQI transmission as a CQI transmission timing of the transmission bandwidth n. Then, the operation shifts to step 17f.

In step 17f, the CQI transmission controller 170 notifies the SNR measuring unit 130 and the CQI generator 180 of a narrow band CQI transmission cycle included in the control information for CQI transmission (i.e. a cycle longer than the CQI transmission cycle included in the control information for CQI transmission) as a CQI transmission cycle of the narrow bandwidth m. The CQI transmission controller 170 also notifies the SNR measuring unit 130 and the CQI generator 180 of the narrow band CQI transmission cycle as the CQI transmission timing of the narrow bandwidth m included in the control information for CQI transmission.

In step 17g, the CQI transmission controller 170 discriminates whether or not new control information for CQI transmission is received from the base station. If the new control information for CQI transmission is received from the base station, the operation shifts to step 17b. If the new control information for CQI transmission is not received, the CQI transmission controller 170 repeats the discrimination until the new control information for CQI transmission is received. When the communication with the base station is ended, this processing is ended.

The SNR measuring unit 130 separates all the resource blocks into groups for each number of resource blocks corresponding to the transmission bandwidth n of which the SNR measuring unit 130 is notified in step 17c. Then, the SNR measuring unit 130 regards one of the resource blocks included in each group as a representative resource block, and measures the SNR of the representative resource block. This measurement is executed in the CQI transmission cycle of which the SNR measuring unit 130 is notified in step 17e, at the CQI transmission timing of which the SNR measuring unit 130 is also notified in step 17e.

Similarly, the CQI generator 180 compares the threshold value represented by the CQI table obtained in step 17c with the SNR of each of the resource blocks of the transmission band as measured by the SNR measuring unit 130, and detects the CQI value which corresponds to the threshold value corresponding to the SNR. To transmit the CQI value of the representative resource block as the CQI information of its group in the cycle designated by the base station, the CQI generator 180 outputs the CQI information to the encoder 190, in the CQI transmission cycle of which the CQI generator 180 is notified in step 17e, at the CQI transmission timing of which the CQI generator 180 is also notified in step 17e.

The SNR measuring unit 130 separates all the resource blocks into groups for each number of resource blocks corresponding to the narrow bandwidth m (>n) of which the SNR measuring unit 130 is notified in step 17d. Then, the SNR measuring unit 130 measures the SNR of each block. This measurement is executed in the CQI transmission cycle of which the SNR measuring unit 130 is notified in step 17f, at the CQI transmission timing of which the SNR measuring unit 130 is also notified in step 17f. In other words, the measurement is executed at a lower frequency than that of the resource blocks of the transmission band.

Similarly, the CQI generator 180 compares the threshold value represented by the CQI table obtained in step 17g with the SNR of the resource block measured by the SNR measuring unit 130, and detects the CQI value which corresponds to the threshold value corresponding to the SNR. The CQI generator 180 outputs to the encoder 190 the CQI value of the representative resource block as the CQI information of its group, in the CQI transmission cycle of which the CQI generator 180 is notified in step 17f, at the CQI transmission timing of which the CQI generator 180 is also notified in step 17f.

The base station assigns each resource block to the mobile station by using the CQI information of the group for each transmission bandwidth n as transmitted from the mobile station by the above processing. At this time, the base station uses the CQI information which the mobile station measures and determines for number n of resource blocks, for the user selection scheduling, as the CQI information for number n of resource blocks. In addition, the base station discriminates the narrowness of the display spread of the path, on the basis of the CQI information of the group of each transmission bandwidth n and the group of each narrow bandwidth m, and updates the value of unit information n on the basis of the discrimination result.

In the mobile station having the above configuration, the resource blocks of the frequencies which are successive and different at the same time are separated into number n of groups on the basis of the transmission bandwidth n of which the base station notifies the mobile station, and one CQI information item for each group is generated and transmitted. Therefore, the number of CQI transmission bits can be reduced to 1/n and, as a result, the signaling overhead based on the CQI of the uplink can be decreased.

In the above embodiment, the mobile station transmits at a low frequency the CQI information obtained by grouping number m of resource blocks that is less than the number n, other than the CQI information obtained by grouping number n of resource blocks, the base station discriminates the CQI correlation in the frequency direction of the resource blocks with the CQI information. Instead of this, however, for example, the base station may discriminate the CQI correlation in the frequency direction of the resource blocks on the basis of the conditions of Ack/Nak and determine the transmission bandwidth n on the basis of the discrimination result.

In addition, the base station discriminates the CQI correlation in the frequency direction of the resource blocks, and determines the transmission bandwidth n on the basis of the discrimination result, but the present invention is not limited to this. For example, the mobile station may discriminates the CQI correlation in the frequency direction of the resource blocks, determine the transmission bandwidth n on the basis of the discrimination result, separate the resource blocks into groups, and transmit the CQI information as described above. The base station receives the CQI information in the CQI format corresponding to the transmission of the CQI information. For this purpose, the mobile station notifies the base station of the CQI format, in each certain cycle. In this case, the mobile station may transmit the CQI information in the CQI format after notifying the base station of the CQI format and obtaining the permission of the base station.

Furthermore, the SNR of the representative resource block included in each group is measured and the CQI value is thereby obtained, but the present invention is not limited to this. For example, the SNR measuring unit 130 measures the SNR of each of the resource blocks included in the group. Then, the CQI generator 180 may compare an average value of results of the measurement with an average value of the threshold values of the CQI table corresponding to this and then obtain the CQI value.

The base station separates the resource blocks into groups and notifies the mobile station of the grouping. However, the base station may not notify the mobile station of the groups, but notify the mobile station of the resource blocks which should be subjected to CQI transmission alone. In this case, the same advantage as that in a case of measuring the SNR of the representative resource block in the group, calculating the CQI value and executing the CQI transmission, can be obtained.

The present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mobile radio terminal, comprising:
a receiver receiving band information from a base station the band information including control information indicating time lengths of resource blocks, different time lengths of sub-frames being defined for the resource blocks corresponding to different CQI transmission cycles;
a detector detecting a receiving quality of a resource block of a frequency band corresponding to the band information received by the receiver, of the resource blocks used for the transmission by the base station; and
a transmitter transmitting to the base station quality information based on the receiving quality detected by the detector in a CQI transmission cycle corresponding to the time length indicated by the control information.

2. The terminal according to claim 1, wherein the receiver receives the cycle information from the base station in a preset cycle.

3. The terminal according to claim 1, wherein the receiver receives the signals in which time lengths of the resource blocks are cyclically different in a frequency direction, from the base station.

4. The terminal according to claim 1, wherein
the receiver receives signals in which proportions of resource blocks different in time length are different for each of base stations.

5. The terminal according to claim 1, wherein
the receiver receives signals in which proportions of resource blocks different in time length are cyclically different in a frequency direction, for each of base stations.

6. A mobile radio terminal, comprising:
a receiver receiving band information which a base station connected to a network transmits to the terminal;
a first detector detecting in a first cycle a receiving quality of a resource block of a frequency band corresponding to the band information received by the receiver, of a plurality of resource blocks used for the transmission by the base station;
a first transmitter transmitting to the base station quality information based on the receiving quality detected by the first detector;
a second detector detecting in a second cycle longer than the first cycle a receiving quality of a resource block of a frequency band which does not correspond to the band information received by the receiver, of a plurality of resource blocks used for the transmission by the base station; and
a second transmitter transmitting to the base station quality information based on the receiving quality detected by the second detector.

7. The terminal according to claim 6, wherein
the receiver receives the cycle information indicating the first cycle and the second cycle from the base station in a preset cycle.

8. The terminal according to claim 6, wherein
the receiver receives signals transmitted in MIMO (Multi-Input Multi-Output) scheme from the base station.

* * * * *